United States Patent [19]

Bowen

[11] Patent Number: 4,930,948
[45] Date of Patent: Jun. 5, 1990

[54] VALVE SEAT REFITTING APPARATUS

[76] Inventor: William H. Bowen, 4311 Bayou Blvd., Pensacola, Fla. 32503

[21] Appl. No.: 399,857

[22] Filed: Aug. 29, 1989

Related U.S. Application Data

[63] Continuation of Ser. No. 214,763, Jul. 5, 1988, abandoned.

[51] Int. Cl.[5] .............................................. B23B 51/00
[52] U.S. Cl. ...................................... 408/190; 408/82; 408/181; 408/191; 408/192; 408/196; 408/201; 408/225
[58] Field of Search ...................... 408/79, 80, 81, 82, 408/83.5, 146, 157, 181, 153, 184, 189, 190, 191, 192, 196, 200, 201, 223, 224, 225, 713; 407/38, 39, 48

[56] References Cited

U.S. PATENT DOCUMENTS

| | | | |
|---|---|---|---|
| 295,466 | 3/1884 | Wallace | 408/158 |
| 1,713,646 | 5/1929 | Deyo | 408/157 |
| 2,347,403 | 4/1944 | Denzler | 408/83.5 |
| 2,358,608 | 9/1944 | Farner | 408/153 |
| 2,362,708 | 11/1944 | Markstrum | 408/153 |
| 3,088,202 | 5/1963 | Murray | 72/324 |
| 4,090,805 | 5/1978 | Grimsley | 408/111 |
| 4,735,529 | 4/1988 | Short | 408/225 |

*Primary Examiner*—Daniel Howell
*Attorney, Agent, or Firm*—George A. Bode

[57] ABSTRACT

A valve seat refitting apparatus. A cylindrical main body portion has a longitudinal bore which receives a centering guide. Longitudinal slots around the outer periphery of the main body portion receive cutting blades rigidly attached to cutting blade support. Radial and longitudinal positioning screws serve to position the supports and cutting blades to refit a variety of valve seats. Set screws lock the blade supports in the desired position. A bushing removably attached to the centering guide also allows the centering guide to be adapted to fit different size valve seats.

16 Claims, 3 Drawing Sheets

VALVE SEAT REFITTING APPARATUS

This is a continuation of application Ser. No. 07/214,763, filed July 5, 1988, now abandoned.

BACKGROUND OF THE INVENTION

1. Field of the Invention

The invention is generally related to valve seat refitting tools and in particular to an apparatus used primarily to cut safety valve seats for reuse is high pressure vessels.

2. General Background

In high pressure situations safety valves open and close frequently. This results in foreign materials being trapped between the valve and valve seat which chip or dent the valve seat, causing leakage and eventual erosion. To maintain proper sealing, the valve seat must be recut to fit tightly with the valve. Apparatus known for cutting or refinishing nozzles and valve seats include the following.

U.S. Pat. No. 4,090,805 issued to E. E. Grimsley entitled "Cutting Tool For Removing Governor Chest Nozzles And Refinishing The Nozzle Seats" discloses a portable cutting tool that rotates and axially advances two (2) symetrically positioned cutting blades that cut away weld material in annular overlapping paths. A second cutting head is provided for refinishing the nozzles seats after the nozzles have been removed.

U.S. Pat. No. 2,393,361 issued to E. G. A. Flodman entitled "Pin Drill And End Mill" discloses symetrically positioned cutting blades.

U.S. Pat. No. 4,178,115 issued to J. L. Pool, U.S. Pat. No. 4,626,143 issued to D. C. Rembold, U.S. Pat. No. 3,901,619 issued to V. A. Scritchfield, U.S. Pat. No. 611,254 issued to A. R. Jackson, U.S. Pat. No. 3,088,202 issued to R. J. Murray, U.S. Pat. No. 2,428,099 issued to L. A. Smith and U.S. Pat. No. 4,147,462 issued to J. R. Appleby, et al. teach valve seat refinishing tools and are representative of the state of the technology in this field.

Although the present state of the art provides a variety of cutting tools, what is needed is a tool which is adjustable to fit a variety of sizes and capable of cutting three (3) faces of the valve seat at the same time.

SUMMARY OF THE PRESENT INVENTION

The present inventions solves the aforementioned problem in a straightforward manner. What is provided is a cylindrical body portion having longitudinal slots cut into four (4) tangential extremities on the body. Provided in each slot is a blade support for supporting a cutting blade. The blade supports are mounted in the longitudinal slots by allen screws. A bore provided in the body portion accepts a guide which fits into the valve seat to be refit. Rotation of the guide causes rotation of the cutting blades which refit the valve seat.

BRIEF DESCRIPTION OF THE DRAWING

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
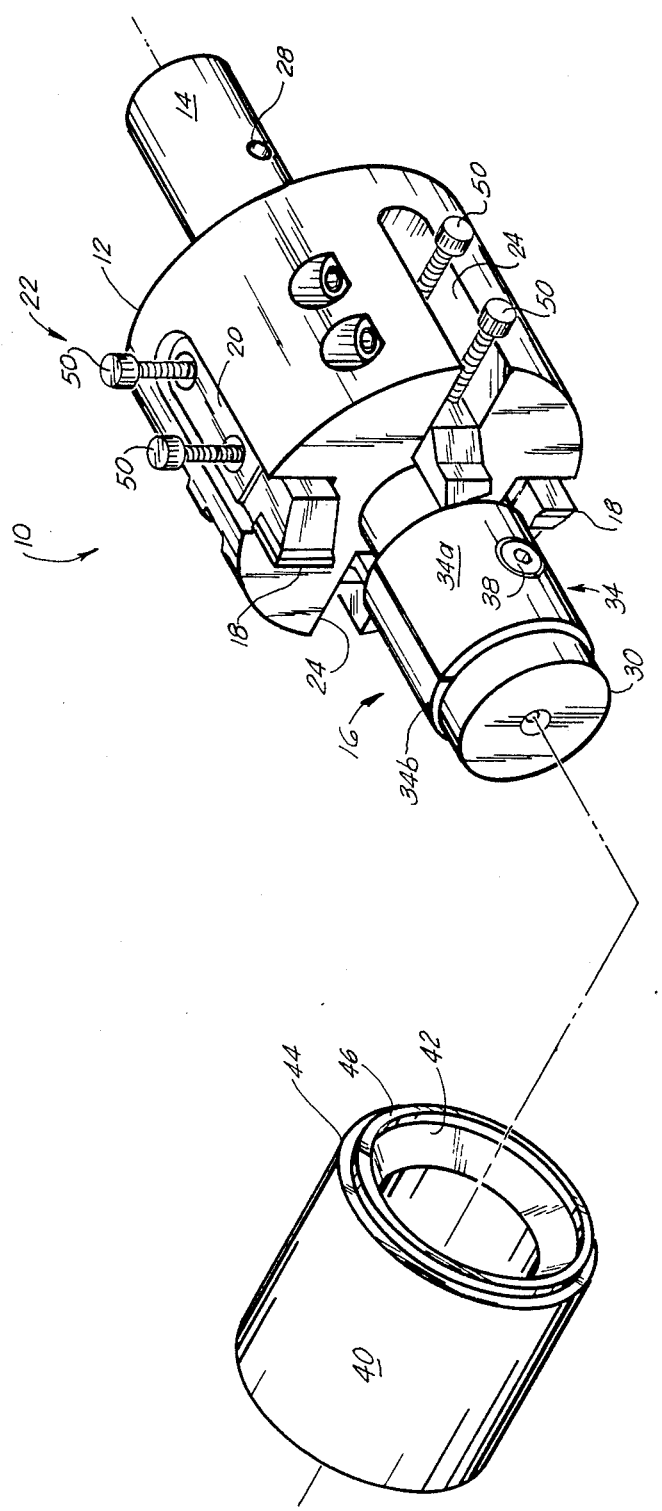
FIG. 1 is a perspective view of the preferred embodiment of the invention.

Referring to the drawings, it is seen that the invention is generally referred to by the numeral 10. Valve seat refitting apparatus 10 is generally comprised of main body portion 12, centering guide 14, means 16 for adjusting centering guide 14 to fit different size valve seats, cutting blades 18, cutting blades support 20, and means 22 for adjusting the position of cutting blades 20.

Figure 2:
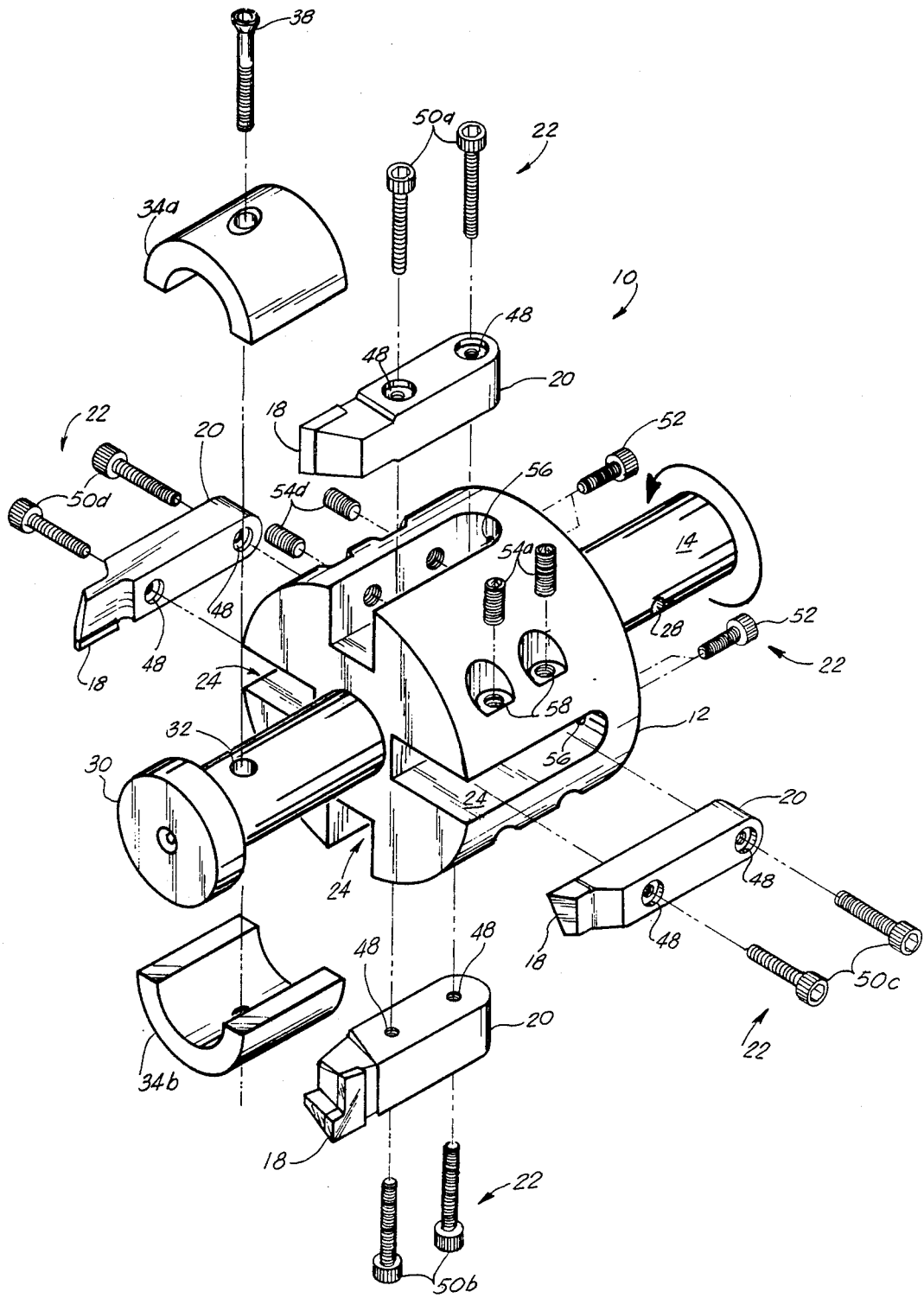
FIG. 2 is an exploded view of the embodiment of FIG. 1.
Figure 3:
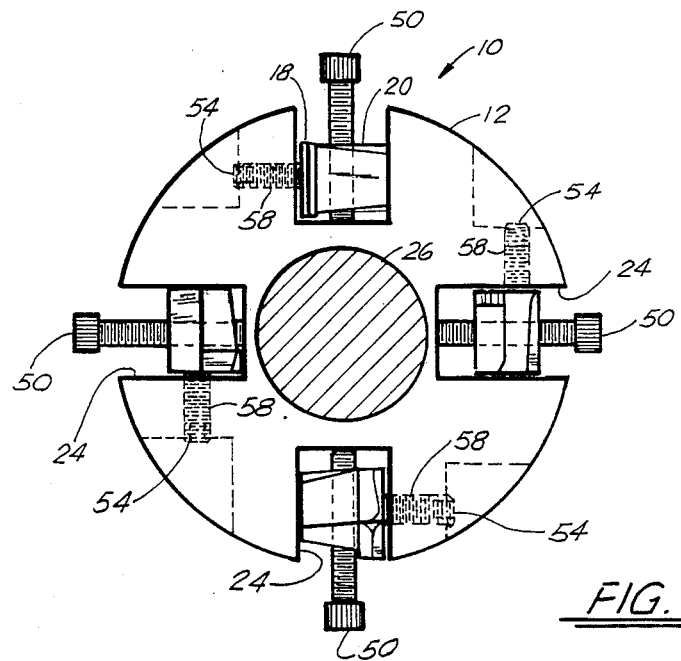
FIG. 3 is a front view of the embodiment of FIG. 1.

As seen in FIGS. 1-3, main body portion 12 is cylindrical and provided with four (4) longitudinal slots 24 substantially equally spaced around the outer periphery of body portion 12. Slots 24 extend from the forward end of body portion 12 toward the rear end and terminate before extending through the rear end. Body portion 12 is also provided with longitudinal bore 26 which is circular in cross-section and extends through the center of body portion 12.

As best seen in FIGS. 1 and 2, bore 26 is adapted to receive centering guide 14. Centering guide 14 is adapted to be rigidly attached to body portion 12 by any suitable means such as tack welding or keyed slots such that rotation of centering guide 14 causes corresponding rotation of body portion 12. To this end, centering guide 14 is provided with a rear radial lateral bore 28 suitable for receiving a handle (not shown) for rotating centering guide 14 and main body portion 12. In operation, there is also provided a guide (not shown) above centering guide 14 to stabilize lower adjusting means 16, discussed hereafter. Centering guide 14 is provided with enlarged forward end 30. Adjacent its forward end, centering guide 14 is provided with forward radial bore 32, best seen in FIG. 2, which provides an attachment point for means 16 for adjusting centering guide 14 to fit different size valve seats.

Adjusting means 16 is comprised of bushing 34 removably attached to centering guide 14 and which is formed form two halves 34a, 34b (in an alternate embodiment, ball bearings may be employed). Halves 34a, 34b are provided with countersunk bores 36a, 36b, respectively, to receive allen screw 38 and a nut (not shown) or half 34b may be threaded to receive screw 38. In this manner, bushing 34 may be attached to the forward end of centering guide 14 as seen in FIG. 1. Bushing 34 is sized so that it provided a relatively close fit within the interior bore of valve seat 40. This allows rotation of valve seat refitting apparatus 10 without any wobble for accurate cutting of the valve seat faces. Various size bushings may be used to adapted centering guide 14 to fit different size valve seats without the necessity of changing centering guide 14.

Figure 4:
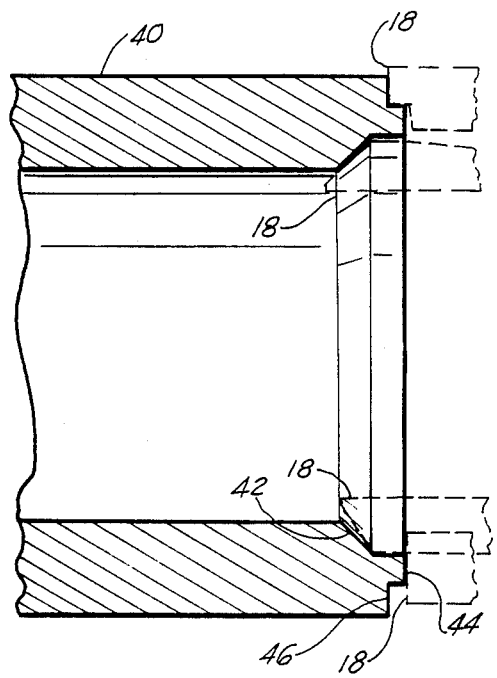
FIG. 4 is a side sectional view of a valve seat being refit by the cutting blades of the embodiment of FIG. 1 (the blades being in phantom).

As seen in phantom view in FIG. 4, cutting blades 18 are shaped to cut the three (3) necessary and separate surfaces of valve seat 40 all at the same time as apparatus 10 is rotated. These three (3) surfaces are forty-five (45°) degree inside shoulder 42, raised horizontal annular surface or seat 44, and outer horizontal shoulder or relief 46. Cutting blades 18 are rigidly attached to, or integral with in the preferred embodiment, cutting blade supports 20. Cutting blade supports 20 provide for adjustable positioning of blades 18 relative to body portion 12. Supports 20 are sized to be received in longitudinal slots 24 and provided with threaded bores 48 which form part of means 22 for adjusting the position of cutting blades 18.

Adjusting means 22 allows for radial and longitudinal adjustment of the position of cutting blades 18 so that a large variety of sizes of valve seats 40 may be refit with use of only one (1) apparatus 10. Means 22 is comprised of radial positioning screws 50, longitudinal positioning screws 52, and set screws 54. As best seen in FIG. 3, radial positioning screws 50 are threadably received in bores 48 of cutting blade supports 20 and are used to place supports 20 and consequently blades 18 at the desired radial position to fit the valve seat being refit. Longitudinal positioning screws 52 are used to set blades 18 at the desired depth for the valve seat being refit. Screws 52 are threadably received by threaded bores 56 at the rear end of body portion 12 such that they extend into slot 24 to abut against the rear end of cutting blade supports 20. Set screws 54 are threadably received by threaded bores 58 so as to extend into slot 24 and bear against supports 20 to lock blades 18 in the desired cutting position.

As clearly seen in FIG. 2, each pair or set of set screws 54 is parallel to two pairs or sets of opposing radial positioning screws 50 (for example, set screws 54a are parallel to opposing radial positioning screws 50a, 50b and set screws 54d are parallel to opposing radial positioning screws 50c, 50d), each pair of set screws 54 being offset from the radial line on which each parallel pair of radial positioning screws 50 project (set screws 54a offset from radial positioning screws 50a, 50b). Further, each pair or set of set screws 54 is perpendicular to the remaining two pairs or sets of opposing radial positioning screws 50 (for example, set screws 54a are perpendicular to opposing radial positioning screws 50c, 50d and set screws 54d are perpendicular to opposing radial positioning screws 50a, 50b).

In operation, a bushing 34 is chosen according to a size which is capable of being rotated within valve seat 40 with a minimum of wobble. Bushing 34 (or bearing) is then attached to centering guide 14. Centering guide 14 and bushing 34 are then inserted into valve seat 40 and cutting blades 18 are adjusted to properly mate with the valve seat faces to be refit and locked in position by set screws 54. With valve seat 40 rigidly held in place, a handle (not shown) is used to cause rotation of centering guide 14 and consequently main body portion 12 and cutting blades 18 to refit all three (3) valve seat faces at the same time. The apparatus provides for economical use and a minimum of parts required as it is adjustable to fit a variety of valve seats and individual blades are easily replaced when worn or broken during use.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A valve seat refitting apparatus, comprising:
   (a) a main body portion having an elongated longitudinal bore therethrough;
   (b) a centering guide provided in said bore and rigidly attached to said main body portion;
   (c) a plurality of cutting blades attached to said main body portion; and,
   (d) means for adjusting the longitudinal and radial position of said cutting blades on said main body portion, said means for adjusting the position of said cutting blades comprising:
      i. said main body portion having a plurality of longitudinal slots provided therein and around its outer periphery;
      ii. a cutting blade support attached to each of said cutting blades and adapted to be received by said longitudinal slots;
      iii. a plurality of sets of adjusting screws provided for radial and longitudinal adjustment of the position of said cutting blades, a first set of said adjusting screws received by and through said cutting blade supports and a second set of said adjusting screws received longitudinally by and through said main body portion for engaging one end of said cutting blade supports; and,
      iv. a plurality of set screws for locking said cutting blade supports in position.

2. The apparatus of claim 1, further comprising means for adapting said centering guide to fit different size valve seats.

3. The apparatus of claim 2, wherein said means for adapting said centering guides comprises a bushing removably attached to said centering guide.

4. The apparatus of claim 1, wherein said main body portion is cylindrical.

5. A valve seat refitting apparatus, comprising:
   (a) a main body portion having an elongated longitudinal bore therethrough;
   (b) a centering guide provided in said bore and rigidly attached to said main body portion;
   (c) said main body portion having a plurality of longitudinal slots provided therein and around its outer periphery;
   (d) a plurality of cutting blades attached to said main body portion;
   (e) a cutting blade support attached to each of said cutting blades and adapted to be received within each of said longitudinal slots; and,
   (f) means for adjusting the longitudinal and radial position of said cutting blade supports on said main body portion, said adjusting means comprise:
      i. radial positioning screws threadably received by and through said cutting blade supports;
      ii. longitudinal positioning screws threadably received longitudinally by and through said main body portion, whereby said longitudinal positioning screws extend into said longitudinal slots to frictionally engage one end of said cutting blade supports; and,
      iii. set screws threadably received by and through said main body portion and extending into said longitudinal slots to lock said blade supports in position.

6. The apparatus of claim 7, wherein said main body portion is cylindrical.

7. The apparatus of claim 7, wherein said cutting blades are shaped to refit a plurality of faces on a valve seat.

8. The apparatus of claim 7, further comprising means for adapting said centering guide to fit different size valve seats.

9. The apparatus of claim 10, wherein said means for adapting said centering guide comprises a bushing removably attached to said centering guide.

10. A valve seat refitting apparatus, comprising:

(a) a main body portion;
(b) a longitudinal bore provided substantially through the center of said main body portion;
(c) a centering guide received in said bore and rigidly attached to said main body portion;
(d) said main body portion having a plurality of longitudinal slots provided therein, said slots being spaced radially outwardly from said central longitudinal bore and around the outer periphery of said main body portion;
(e) a cutting blade rigidly attached to a cutting blade support adapted to be received within each of said longitudinal slots, whereby said cutting blades extend forward of said main body portion; and,
(f) means for adjusting the radial and longitudinal position of said cutting blades relative to said main body portion, wherein said adjusting means comprise:
  i. radial positioning screws threadably radially received by and through each of said cutting blade supports;
  ii. longitudinal positioning screws threadably received longitudinally by and through one end surface of said main body portion, whereby said longitudinal positioning screws extend into each of said longitudinal slots to frictionally engage one end of each of said cutting blade supports; and,
  iii. set screws threadably received by and through said main body portion and extending into each of said longitudinal slots to engage and thereby lock said supports fixedly in position.

11. The apparatus of claim 10, wherein said set screws are either parallel or perpendicular to said radial positioning screws.

12. The apparatus of claim 11, wherein said set screws are off-set radially from their said parallel radial positioning screws.

13. The apparatus of claim 10, wherein said cutting blades are shaped to refit a plurality of faces on a valve seat.

14. The apparatus of claim 13, wherein said main body portion is cylindrical.

15. The apparatus of claim 13, further comprising means for adapting said centering guide to fit different size valve seats.

16. The apparatus of claim 15, wherein said means for adapting said centering guide comprises a bushing removably attached to said centering guide.

* * * * *